US012603822B2

(12) United States Patent
Boyer et al.

(10) Patent No.: US 12,603,822 B2
(45) Date of Patent: Apr. 14, 2026

(54) SOFTWARE AS A SERVICE (SaaS) USER INTERFACE (UI) FOR DISPLAYING USER ACTIVITIES IN AN ARTIFICIAL INTELLIGENCE (AI)-BASED CYBER THREAT DEFENSE SYSTEM

(71) Applicant: Darktrace Holdings Limited, Cambridge (GB)

(72) Inventors: John Anthony Boyer, Cambridge (GB); Constance Alice Chapman, Cambridge (GB); Matthew Charles Sherwin, Cambridge (GB); Jack Benjamin Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 942 days.

(21) Appl. No.: 17/323,853

(22) Filed: May 18, 2021

(65) Prior Publication Data

US 2021/0273973 A1      Sep. 2, 2021

Related U.S. Application Data

(63) Continuation-in-part of application No. 17/187,169, filed on Feb. 26, 2021.

(Continued)

(51) Int. Cl.
*H04L 9/00* (2022.01)
*G06F 18/214* (2023.01)
(Continued)

(52) U.S. Cl.
CPC ........ *H04L 41/5045* (2013.01); *G06F 18/214* (2023.01); *G06N 20/00* (2019.01);
(Continued)

(58) Field of Classification Search
CPC .. G06N 20/00; H04L 63/1416; H04L 63/1433
(Continued)

(56) References Cited

U.S. PATENT DOCUMENTS 6,154,844 A    11/2000  Touboul et al.
6,965,968 B1   11/2005  Touboul
(Continued)

FOREIGN PATENT DOCUMENTS

EP        2922268 A1     9/2015
WO      2001031420 A2     5/2001
(Continued)

OTHER PUBLICATIONS

European Patent office Communication pursuant to Rules 161(1) and 162 EPC, Oct. 6, 2022, 3 pages.
(Continued)

*Primary Examiner* — Christopher J Brown
(74) *Attorney, Agent, or Firm* — Rutan and Tucker, LLP

(57) ABSTRACT

A Software as a Service (SaaS) console can retrieve data from one or more application programming interfaces (APIs) hosted by one or more SaaS platforms in order to identify cyber threats in a cyber threat defense system. The SaaS console can use customizable generic templates to provide a regular i) polling service, ii) data retrieval service, and iii) any combination of both, as well as a universal way to obtain data from the one or more APIs hosted by one or more SaaS platforms to collect event-based activity data from the one or more APIs. Data fields of the one or more customizable generic template are configured to be populated with data incorporated from a first user of a first SaaS platform for a first API for the first SaaS platform.

20 Claims, 11 Drawing Sheets

Related U.S. Application Data

(60) Provisional application No. 63/078,092, filed on Sep. 14, 2020, provisional application No. 63/026,446, filed on May 18, 2020, provisional application No. 62/983,307, filed on Feb. 28, 2020.

(51) Int. Cl.

| | |
|---|---|
| *G06N 20/00* | (2019.01) |
| *G06V 10/762* | (2022.01) |
| *G06V 10/774* | (2022.01) |
| *H04L 9/40* | (2022.01) |
| *H04L 41/22* | (2022.01) |
| *H04L 41/5041* | (2022.01) |

(52) U.S. Cl.
CPC .......... *G06V 10/762* (2022.01); *G06V 10/774* (2022.01); *H04L 41/22* (2013.01); *H04L 63/1416* (2013.01); *H04L 63/1433* (2013.01)

(58) Field of Classification Search
USPC .......................................................... 726/25
See application file for complete search history.

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 7,890,869 | B1 | 2/2011 | Mayer et al. |
| 8,312,540 | B1 | 11/2012 | Kahn et al. |
| 8,661,538 | B2 | 2/2014 | Cohen-Ganor et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,098,333 | B1* | 8/2015 | Obrecht .................... G06F 9/50 |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,348,742 | B1 | 5/2016 | Brezinski |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmuell et al. |
| 9,727,723 | B1 | 8/2017 | Kondaveeti et al. |
| 10,237,298 | B1 | 3/2019 | Nguyen et al. |
| 10,268,821 | B2 | 4/2019 | Stockdale |
| 10,419,466 | B2 | 9/2019 | Ferguson |
| 10,516,693 | B2 | 12/2019 | Stockdale et al. |
| 10,701,093 | B2 | 6/2020 | Dean |
| 10,908,970 | B1* | 2/2021 | Arivazhagan ............. G06F 9/54 |
| 2002/0174217 | A1 | 11/2002 | Anderson et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1* | 5/2007 | Hertzog ................ G06F 21/552 |
| | | | 726/23 |
| 2007/0294187 | A1 | 12/2007 | Scherrer |
| 2008/0005137 | A1 | 1/2008 | Surendran et al. |
| 2008/0077358 | A1 | 3/2008 | Marvasti |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0095374 | A1 | 4/2010 | Gillum et al. |
| 2010/0107254 | A1 | 4/2010 | Eiland et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |

| | | | |
|---|---|---|---|
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0052614 | A1 | 2/2015 | Crowell |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0281287 | A1 | 10/2015 | Gill |
| 2015/0286819 | A1 | 10/2015 | Coden et al. |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0352768 | A1 | 12/2016 | Lefebvre et al. |
| 2016/0359695 | A1 | 12/2016 | Yadav et al. |
| 2016/0373476 | A1 | 12/2016 | Dell'Anno et al. |
| 2016/0373477 | A1 | 12/2016 | Moyle et al. |
| 2017/0054745 | A1 | 2/2017 | Zhang et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0118239 | A1* | 4/2017 | Most .................... H04L 63/168 |
| 2017/0169360 | A1 | 6/2017 | Veeramachaneni et al. |
| 2017/0270422 | A1 | 9/2017 | Sorakado |
| 2018/0027006 | A1 | 1/2018 | Zimmermann et al. |
| 2018/0167402 | A1 | 6/2018 | Scheidler et al. |
| 2018/0234310 | A1* | 8/2018 | Ingalls ................... H04L 41/12 |
| 2018/0375886 | A1 | 12/2018 | Kirti |
| 2019/0036948 | A1 | 1/2019 | Appel et al. |
| 2019/0044963 | A1 | 2/2019 | Rajasekharan et al. |
| 2019/0251260 | A1 | 8/2019 | Stockdale et al. |
| 2020/0090171 | A1 | 3/2020 | Bajpai |
| 2020/0244673 | A1 | 7/2020 | Stockdale |
| 2020/0259852 | A1* | 8/2020 | Wolff ..................... H04L 67/10 |
| 2020/0280575 | A1 | 9/2020 | Dean et al. |
| 2021/0120027 | A1 | 4/2021 | Dean et al. |
| 2021/0157919 | A1 | 5/2021 | Stockdale et al. |
| 2021/0194911 | A1 | 6/2021 | Hecht |
| 2021/0273958 | A1 | 9/2021 | McLean |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | 2019243579 A1 | 12/2019 |
| WO | 2020021100 A1 | 1/2020 |

OTHER PUBLICATIONS

International Search Authority, The International Preliminary Report on Patentability, Aug. 30, 2022, 10 pages.

(56) References Cited

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

Gharan, Shayan Oveis, "Lecture 11; Clustering and the Spectral Partitioning Algorithm" May 2, 2016, 6 pages.

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology,".

Senseon Tech Ltd., "Senseon & You,".

Senseon Tech Ltd., "Technology Overview,".

Senseon Tech Ltd., "Senseon Enterprise,".

Senseon Tech Ltd., "Senseon Pro,".

Senseon Tech Ltd., "Senseon Reflex,".

United States Patent and Trademark Office; Non-Final Office Action, Feb. 27, 2024; 39 pages.

* cited by examiner

SOFTWARE AS A SERVICE (SaaS) USER INTERFACE (UI) FOR DISPLAYING USER ACTIVITIES IN AN ARTIFICIAL INTELLIGENCE (AI)-BASED CYBER THREAT DEFENSE SYSTEM

RELATED APPLICATIONS

This application claims priority to and the benefit of under 35 USC 119 of U.S. provisional patent application titled "A cyber security system using artificial intelligence," filed May 18, 2020, Ser. No. 63/026,446 and claims priority to and the benefit of under 35 USC 119 of U.S. provisional patent application titled "An Intelligent Cyber Security System," filed Sep. 14, 2020, Ser. No. 63/078,092, which is incorporated herein by reference in its entirety. In addition, this application claims priority to and the benefit as a continuation in part application under 35 USC 120 of U.S. non-provisional patent application titled "Cyber security for Software-as-a-Service factoring risk," filed Feb. 26, 2021, Ser. No. 17/187,169, which claims priority to and the benefit of under 35 USC 119 of U.S. provisional patent application titled "An Artificial Intelligence Based Cyber Security System," filed Feb. 28, 2020, Ser. No. 62/983,307, and U.S. provisional patent application titled "An Intelligent Cyber Security System," filed Sep. 14, 2020, Ser. No. 63/078,092. All of which are incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the present disclosure generally relate to a cyber security and threat defense system. More particularly, an embodiment relates a SaaS UI configured to visually display user activities, events, and locational anomalies in an AI-based cyber threat defense system.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures. In today's environment, this approach to defend against cyber threats is fundamentally flawed:

Threats are constantly evolving—novel attacks do not match historical-attack "signatures", and even subtle changes to previously understood attacks can result in them going undetected by legacy defenses;

Rules and policies defined by organizations are continually insufficient—security teams simply can't imagine every possible thing that may go wrong in the future; and Employee 'insider' threat is a growing trend—it is difficult to spot malicious employees behaving inappropriately as they are a legitimate presence on the business network.

The reality is that modern threats bypass the traditional legacy defense tools on a daily basis. These tools need a new tool based on a new approach that can complement them and mitigate their deficiencies at scale across the entirety of digital organizations. In the complex modern world, it is advantageous that the approach is fully automated as it is virtually impossible for humans to sift through the vast amount of security information gathered each minute within a digital business.

SUMMARY

In an embodiment, various methods, apparatuses, and systems are discussed for a SaaS system. A Software as a Service (SaaS) console can retrieve data from one or more application programming interfaces (APIs) hosted by one or more SaaS platforms in order to identify cyber threats in a cyber threat defense system. The SaaS console can use customizable generic templates to provide a regular i) polling service, ii) data retrieval service, and iii) any combination of both, as well as a universal way to obtain data from the one or more APIs hosted by one or more SaaS platforms to collect event-based activity data from the one or more APIs. Data fields of the one or more customizable generic template are configured to be populated with data incorporated from a first user of a first SaaS platform for a first API for the first SaaS platform.

These and other features of the design provided herein can be better understood with reference to the drawings, description, and claims, all of which form the disclosure of this patent application.

DRAWINGS

The drawings refer to some embodiments of the design provided herein in which.

Figure 8A:
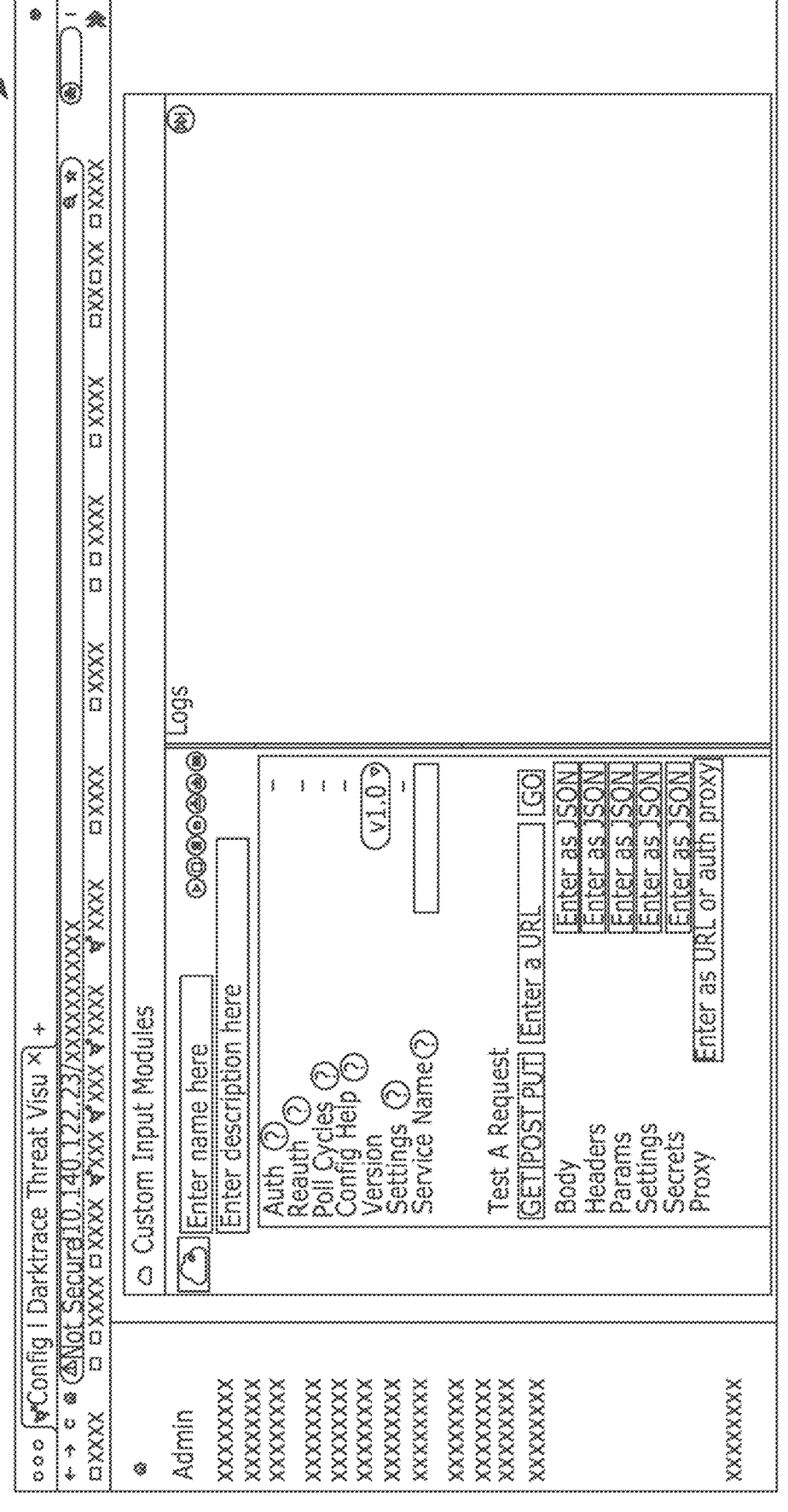
FIG. 8A illustrates a simple user interface for a customizable generic template that allows a SaaS provider to customize how SaaS information is pulled and/or retrieved from their API.
Figure 8B:
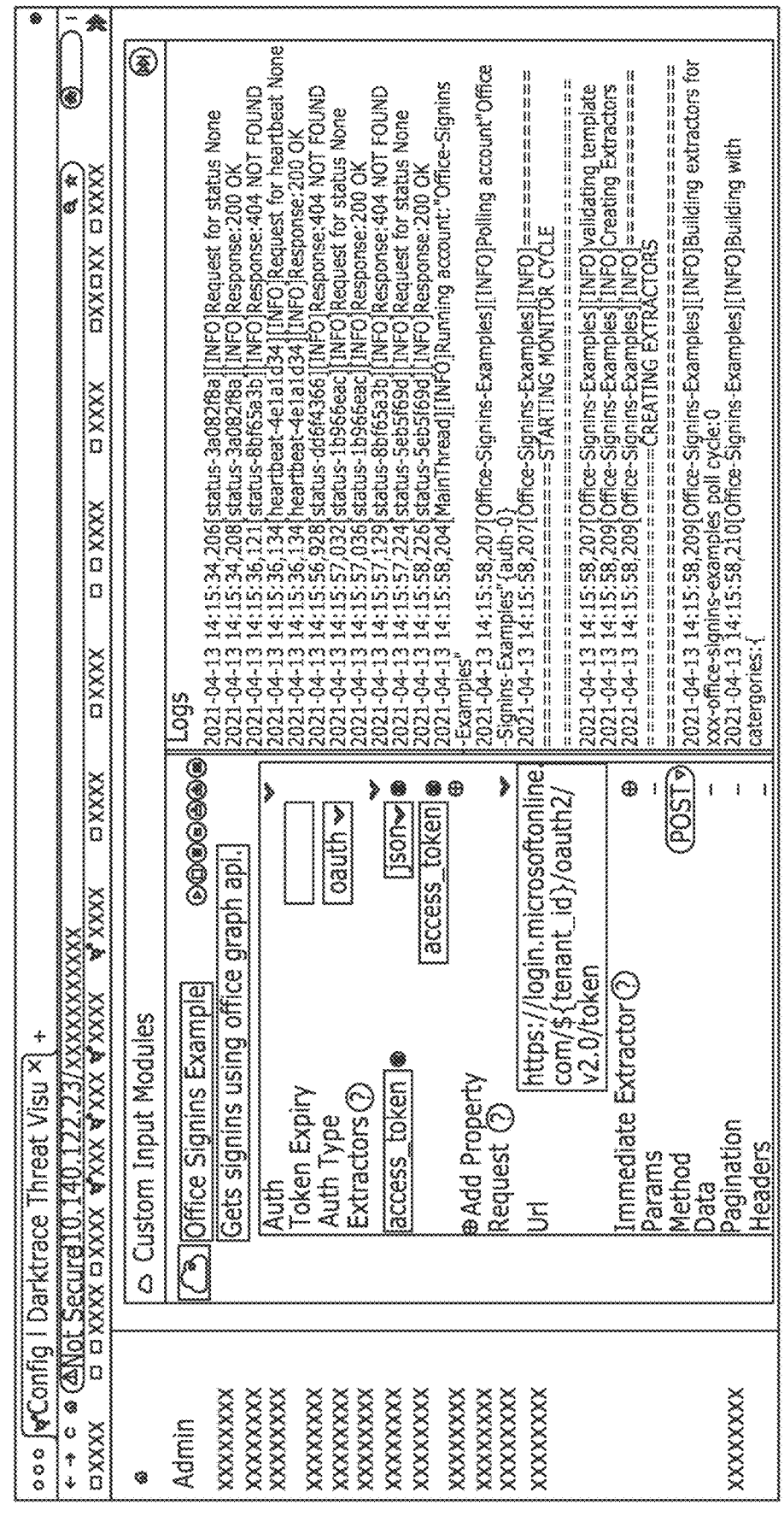
Figure 9:
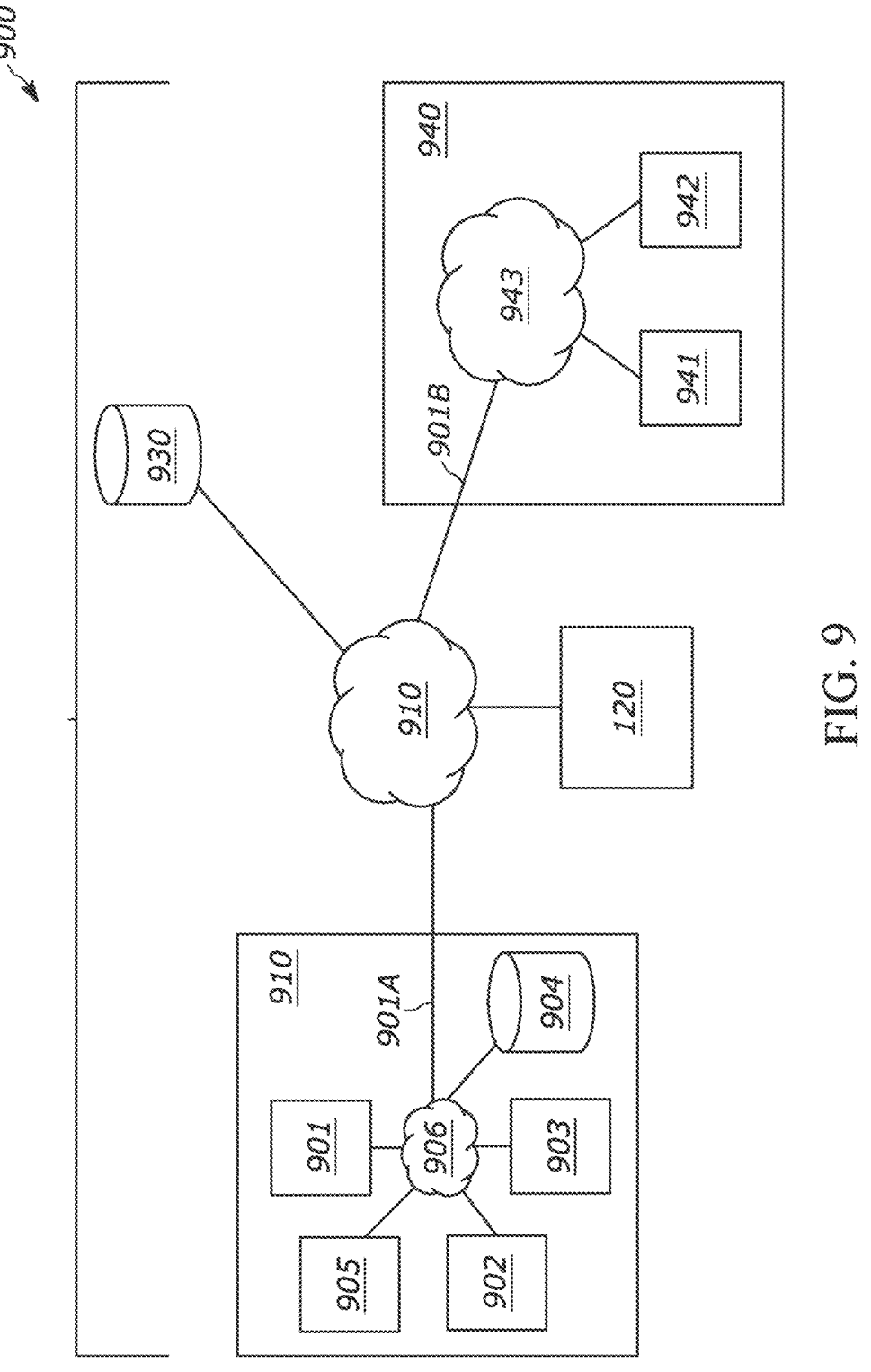

FIG. 8B illustrates a simple UI presented for a customizable generic template with fields usable by external users who have nothing to do with coding or know anything about the back end system of the SaaS UI console but facilitates a retrieving of SaaS data from one or more APIs; and FIG. 9 illustrates a block diagram of an exemplary AI-based cyber security system having a SaaS UI communicatively coupled to a cyber security appliance configured to protect a network, a database server, and one or more computing devices, in accordance with several embodiments of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
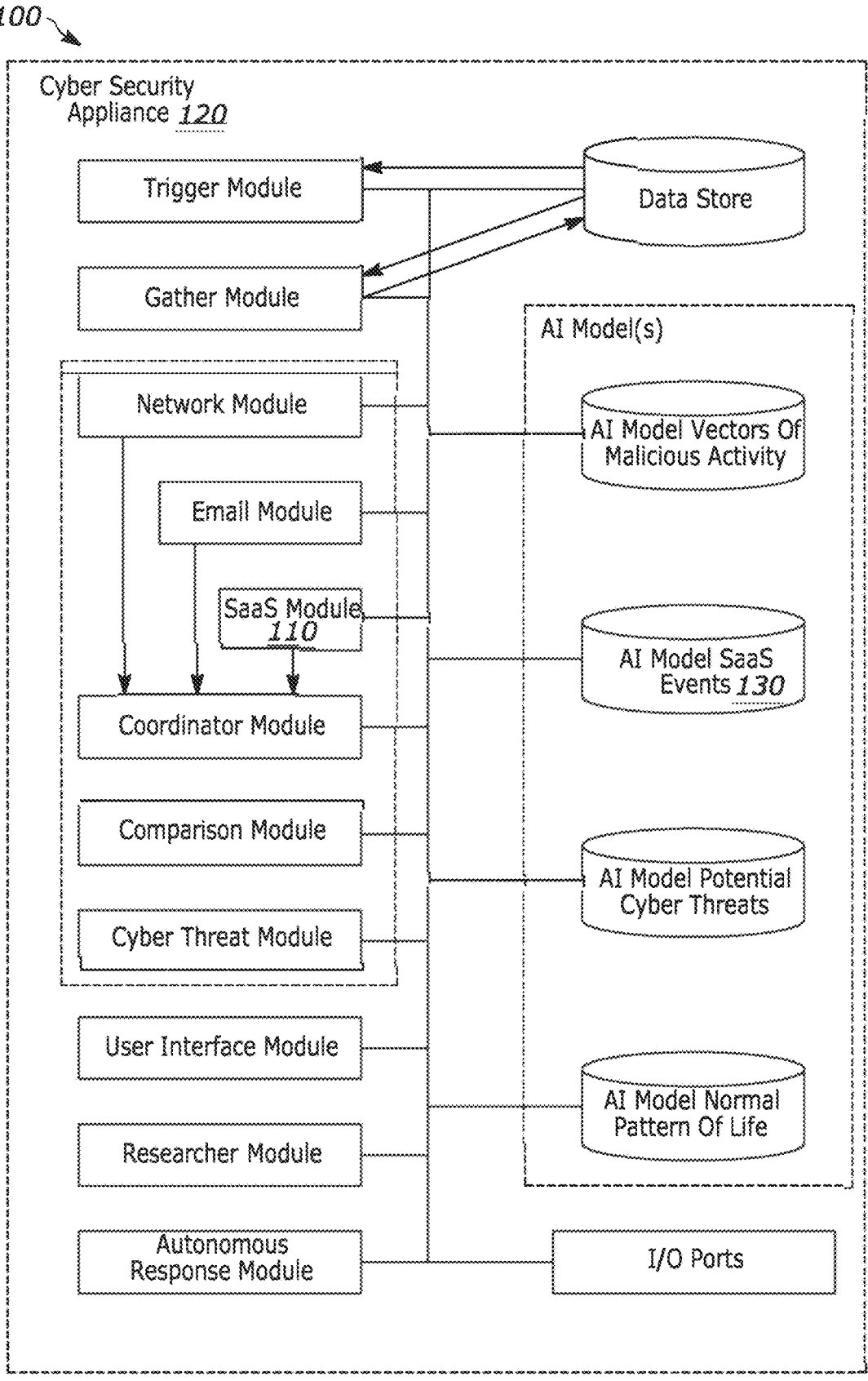
FIG. 1 illustrates an exemplary block diagram of an AI-based cyber threat detection system having a cyber security appliance with a SaaS module, a SaaS UI module, a host endpoint security module, and various other modules, which are configured to cooperate with each other and one or more machine learning models, in accordance with an embodiment of the disclosure.

FIG. 1 illustrates an exemplary block diagram of an AI-based cyber threat detection system having a cyber security appliance with a SaaS module, a SaaS UI module, a host endpoint security module, and various other modules, which are configured to cooperate with each other and one or more machine learning models, in accordance with an embodiment of the disclosure.

Figure 2:
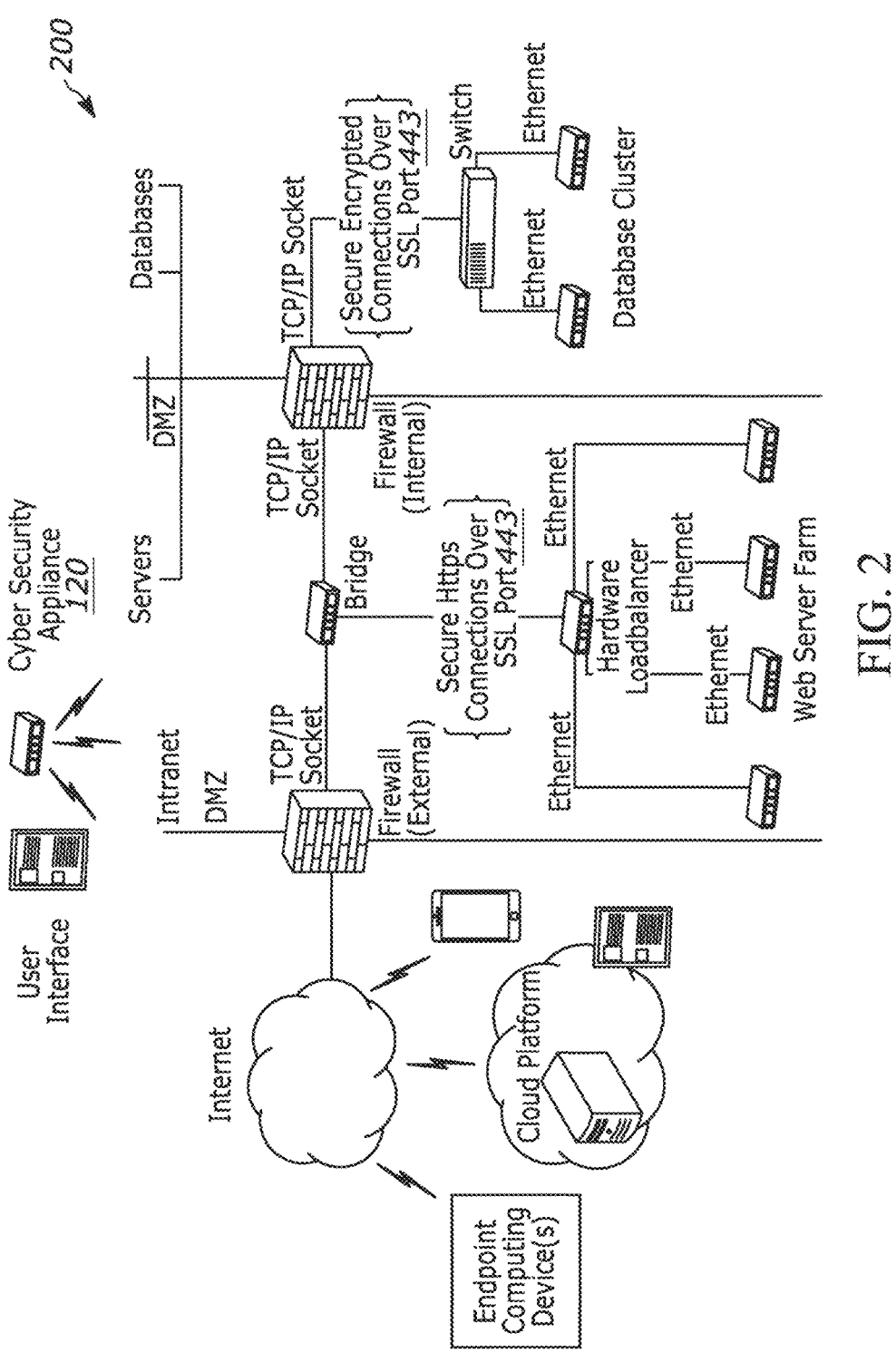
FIG. 2 illustrates an exemplary block diagram of an AI-based cyber security system having a cyber security appliance configured to protect various network devices, endpoint computing devices, and a SaaS/cloud-based platform communicatively coupled over a network, in accordance with an embodiment of the disclosure.

FIG. 2 illustrates an exemplary block diagram of an AI-based cyber security system having a cyber security appliance configured to protect various network devices, endpoint computing devices, and a SaaS/cloud-based platform communicatively coupled over a network, in accordance with an embodiment of the disclosure.

FIG. 8A illustrates a simple user interface for a first customizable generic template 800 that allows a SaaS provider to customize how SaaS information is pulled and/or retrieved from their API. FIG. 8B illustrates a simple UI presented for a second customizable generic template 801 with fields usable by external users who have nothing to do with coding or know anything about the back end system of the SaaS UI console but facilitates a retrieving of SaaS data from one or more APIs. The Software as a Service (SaaS) console can retrieve data from one or more application programming interfaces (APIs) hosted by one or more SaaS platforms in order to identify cyber threats in a cyber threat defense system.

The SaaS console can use customizable generic templates 800, 801, such as custom input modules, to provide a regular polling/data retrieval service and a universal way to obtain data from one or more SaaS provider (third party) APIs to collect event-based activity data. The event-based activity data includes at least one or more of event anomaly data, location anomaly data, and action anomaly data in a SaaS environment. The event anomaly data, the location anomaly data, and the action anomaly data are analyzed to determine an event anomaly, a location anomaly, and an action anomaly performed by an entity, e.g. user, a device and any combination of both, associated with one or more environments. The SaaS console generates a plurality of SaaS user interfaces (UIs) for visually displaying the collected event-based activity data to users operating the SaaS console.

A cyber security appliance with custom input modules can be configured to provide a regular polling/data retrieval service into the cyber security appliance. An extensible input module with a simple user interface which provides a regular polling/data retrieval service to any external service which supports an API with basic authentication, where the user may identify key datapoints for extraction which are fed into the machine learning framework at the heart of the cyber security system for anomaly detection. This data is modeled as pattern-of-life data and can be used to enrich/correlate with existing network traffic and SaaS data.

The custom input module can be a customizable generic template 800, 801 that allows a SaaS provider to customize SaaS information pulling and/or retrieval from their API. The data fields of the one or more custom input modules are configured to be populated with data incorporated from the user of the SaaS platform. For example, the SaaS provider can categorize the type of SaaS event information failed connection event, Admin event, sharing event, login event, file uploaded event, resource deleted event, the SaaS provider can set the type of authentication method they want and how often and/or when the authentication needs to occur, how often the polling or retrieval of the SaaS information will occur, etc. The custom input module can take in the data/information from the SaaS provider and output scripted code on how a developer would hand code the information mapping, information categorization, and authentication with that particular SaaS provider's API.

The SaaS console can cooperate with one or more machine-learning models trained on a normal benign behavior of an entity to compare at least one or more of the collected event-based activity data from the incorporated data to one or more machine-learning models trained on a normal benign behavior of that entity in relation to the SaaS environment using a normal behavior benchmark.

The custom input module is built from an authentication submodule which takes an input of authentication information, an optional reauthentication submodule (depending on the environment), and multiple extraction submodules. The authentication with the API can be with tokens, keys, two-factor authentication, etc. The authentication module takes an input of authentication information, validates the authentication information and displays the response to the operator who identifies the key fields of the response for the system. The customer with the customizable generic template 800, 801 supplies what method of authentication that want for the custom input module to authenticate with the SaaS providers API in order to poll and/or perform data retrieval from the API. The reauthentication module performs the same functionality but identifies the fields required to keep authenticating with the external service after the initial auth. Finally, the extraction modules take an input of a location to request data from and the fields to extract from the returned data—to make the request, the fields identified in the previous modules are available as variables. Multiple extraction modules may be defined to retrieve from multiple API endpoints—the response from the external service is represented to the user along with the fields they extracted in case they want to extract other fields or change their extraction parameters.

The customizable generic templates 800, 801, such as custom input modules, are configured to be capable of being shared and used by all of the users operating the SaaS console.

Referring back to FIG. 1, note, SaaS event-based activity data doesn't have to have come into the SaaS console only through customizable generic templates, the event-based activity data can come through a SaaS module 110 and SaaS connectors cooperating with the SaaS module 110. Also, the entities can include at least one of SaaS-based users and cloud-based users that are associated with one or more network users in the cyber threat defense system as well maybe a device associated with the network.

A cyber threat module in cooperation with one or more machine learning models trained on a normal benign behavior of that entity in relation to the SaaS environment can determine whether the entity is in a breach state of the normal behavior benchmark. The cyber threat module in cooperation with one or more machine learning models trained on cyber threats can identify whether the determined breach state of the normal behavior benchmark in conjunction with a chain of relevant behavioral parameters are deviating from the normal benign behavior of that entity correspond to a cyber threat. The normal behavior benchmark is configured based on one or more parameters corresponding to a normal pattern of entity activity for that entity to spot behavior on a network deviating from the normal benign behavior.

An autonomous response module itself; rather than a human, can generate an autonomous action in response to the cyber threat.

The SaaS console with the multiple SaaS UIs can visually display the event-based activity data with multiple user interfaces each configured to display a particular type of SaaS event-based activity data. The event-based activity data can include one or more of event anomaly data, location anomaly data, and action anomaly data in a SaaS environment. The SaaS UIs use non-numeric shapes, symbols and/or colors to visually display different types of SaaS event-based activity data so it is quickly recognizable by a human that some SaaS activity indicated on the display screen with non-numeric shapes, symbols and/or colors is different from the normal and other SaaS activity so that the human can quickly visually recognize this SaaS activity is different from the normal and other SaaS activity. The SaaS console and its multiple UIs assist in detecting locational behavior anomalies and user behavior anomalies at a glance. The SaaS UIs assist in threat hunting and anomaly detection in a SaaS environment setting.

Figure 3:
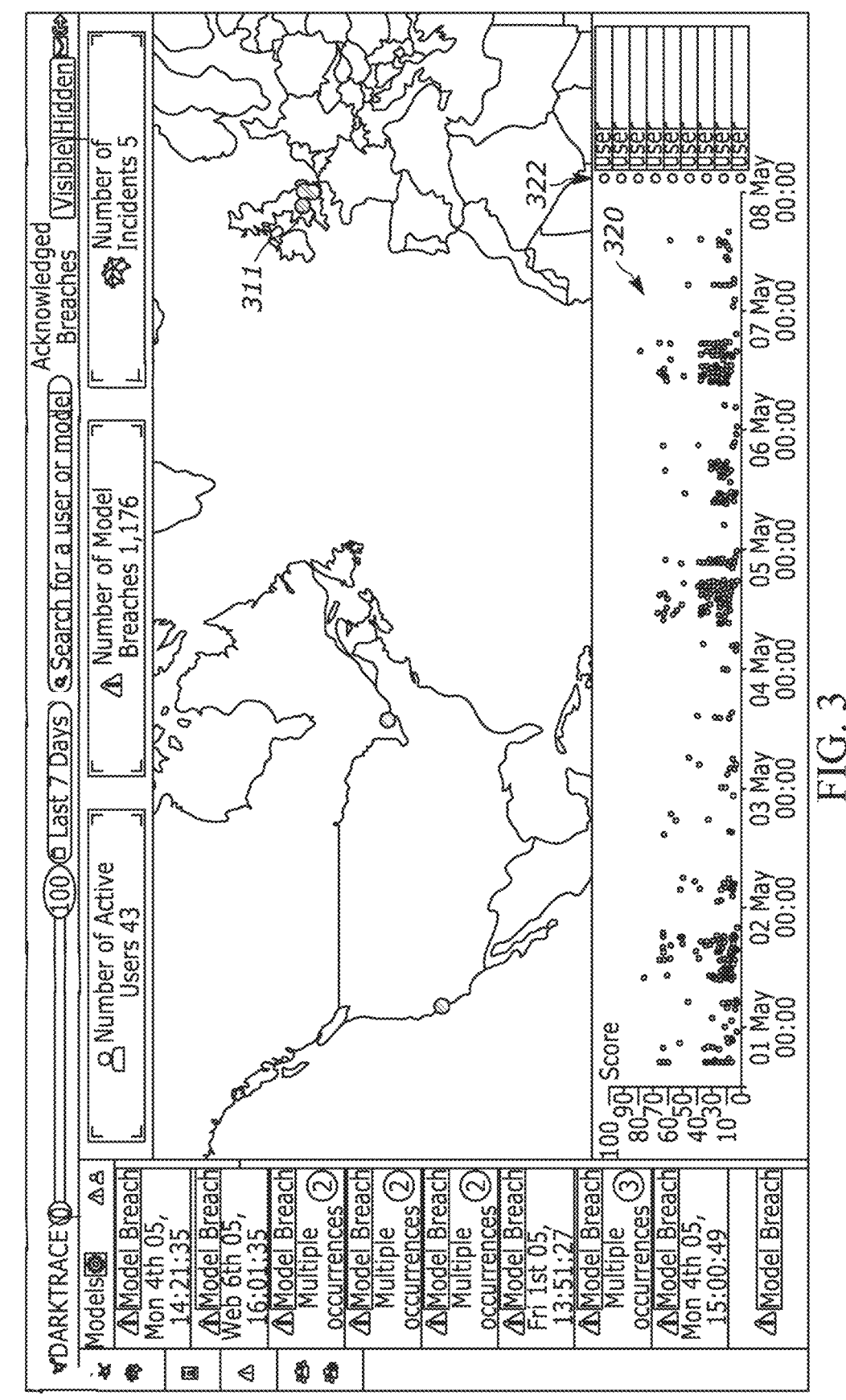
FIG. 3 illustrates a first screenshot of a SaaS UI configured to display one or more locational anomalies of SaaS users in a SaaS/cloud-based environment, in accordance with an embodiment of the disclosure.

FIG. 3 illustrates a first screenshot of a SaaS UI configured to display one or more locational anomalies of SaaS users in a SaaS/cloud-based environment, in accordance with an embodiment of the disclosure.

The SaaS UI 300 is configured to visually display one or more locational anomalies for SaaS and/or Cloud users in a quickly understandable representation. In a SaaS environment, location data is incredibly relevant because where geographically a user and/or user's device is logging in from can assist in threat hunting and anomaly detection in a SaaS environment setting. A user of the SaaS console viewing the UIs will know the difference between that entity from logging in from Liverpool and logging in from Los Angeles. In addition, with a few additional visual aids, the same user of the SaaS console viewing the UIs can determine if it is unusual for the entity to login from London when they normally login from Liverpool.

A cyber security appliance with a SaaS UI 300 having a window and classifier can be configured to visually display one or more locational anomalies for SaaS and/or Cloud users in a quickly understandable representation. A representation of a locational anomaly—a visualization of all user activity mapped to IP address and autonomous system number (ASN)—and the level of unusualness of that location. The representation of the locational anomaly can be derived by the Continuous Gaussian Construction for Anomaly Detection classifier. A SaaS UI 300 dashboard displays a world map with non-numerical visual indicators, such as 'bubble' icons or plotted graphs, for each location of activity, visually colored different colors to indicate an anomaly level. (See for example the 'blue' bubbles in FIG. 3), which could be, for example, turn yellow or red to indicate a higher anomaly level. This is a visually engaging and quick way to represent the results of machine learning classifiers to an operator who may choose to act upon them as opposed to simply displaying a number.

Figure 4A:
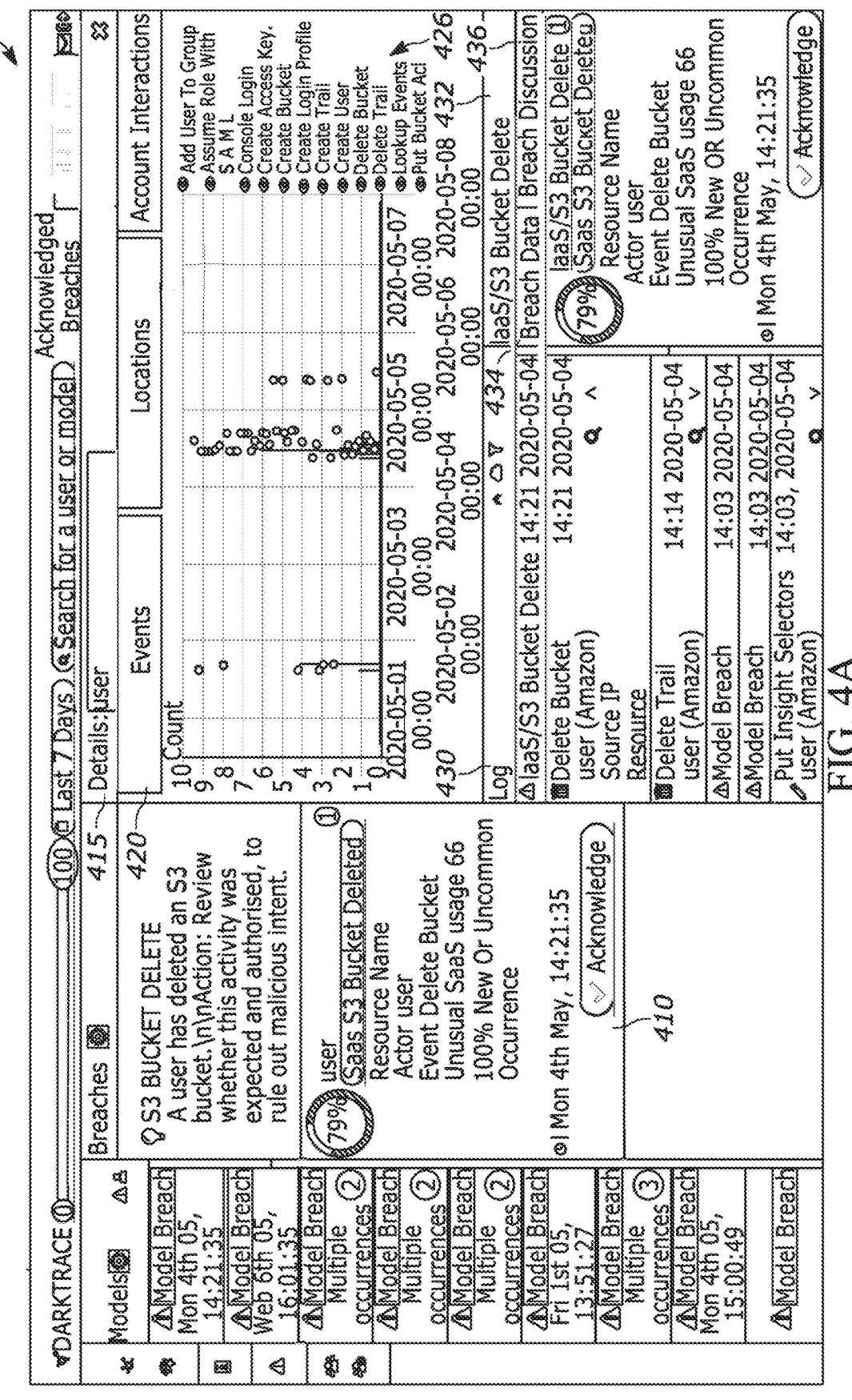
FIG. 4A illustrates a second screenshot of a SaaS UI configured to display one or more user activities, events, anomalies, and/or account interactions in a SaaS/cloud-based environment, in accordance with an embodiment of the disclosure.
Figure 4B:
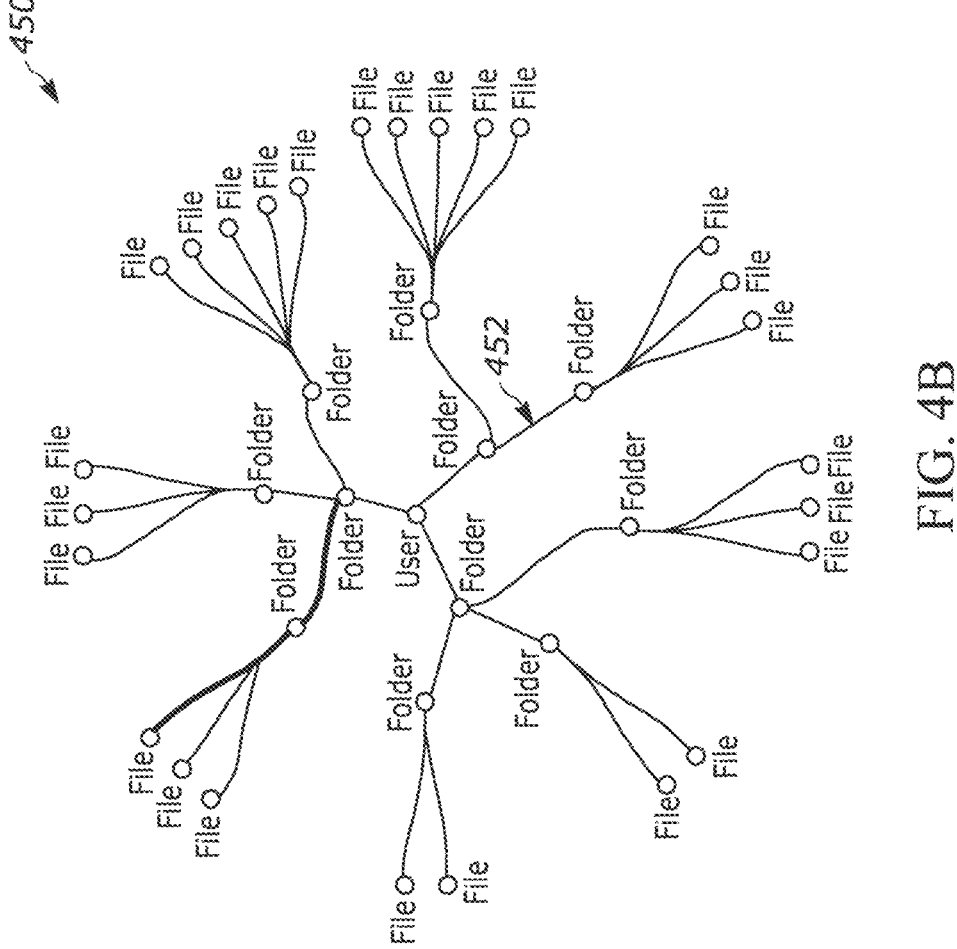
FIG. 4B illustrates an interactive radial diagram of the SaaS user activities depicted in FIG. 4A, which are represented with paths interconnected between a series of nodes and sub-nodes, in accordance with an embodiment of the disclosure.

FIG. 4B illustrates an interactive radial diagram of the SaaS user activities depicted in FIG. 4A, which are represented with paths interconnected between a series of nodes and sub-nodes, in accordance with an embodiment of the disclosure.

A cyber security appliance with a SaaS UI 450 can be configured to have a quickly understandable visual representations of a user activity anomaly in a SaaS and/or Cloud environment that allows a human led investigation of a large amount of user events occurring over a long timeframe to be reviewed by the human investigator quite rapidly. A SaaS UI 450 can be configured to present quickly understandable visual representations of user activity anomaly in a SaaS and/or Cloud environment. Proposed are two methods of representing user activity anomaly in a Cloud or SaaS environment, given an anomaly score computed by a machine learning algorithm. The anomaly score can be computed by an anomaly score classifier, such as the Network Sequence Prediction using Transformers trained on SaaS and/or Cloud activity. The training is on what should be expected and then display the variation from normal/expected SaaS and/or Cloud activity. The first is a real-time or re-playable radial diagram where user activity is represented as paths between a series of nodes and their sub-nodes in a tree-like format or some other node structure. (See the example in FIG. 4B) The nodes may represent files and folders, structured resources, or any finite sequence of events. In this example, user activity is represented as colored paths between these nodes from a central node, where color defines anomaly and line thickness represents frequency of use. For example, a user accesses files in a standard folder and the path is, for example, green. The user accesses files in an unusual folder and the path 452 is, for example, red. The line becomes thicker with doing that action more times. In live playback, the path persists for a short period of time. This allows an operator to playback user activity at speed and identify the anomalous activities amongst the noise of general user behavior.

FIG. 4A illustrates a second screenshot of a SaaS UI configured to display one or more user activities, events, anomalies, and/or account interactions in a SaaS/cloud-based environment, in accordance with an embodiment of the disclosure.

The second proposition is, given a timeframe and an event type, the SaaS UI 400 is plotted as a series of points (potentially joined by a line) of event frequency against time. (See the example graph in FIG. 4A) The measure of anomaly score of user actual activity is shown in different colors and dot sizes. The graph can also display the expected number of the given event in the given timeframe. Using the output of the anomaly score classifier, the tolerance of the expected number of the given event in the given timeframe is plotted on the graph to show the "normal" range. The expected number of the given event in the given timeframe can be displayed as a line bar or an elliptical ring, etc. superimposed along with the actual data. An operator using the user interface can therefore see at a glance when an activity broke the bounds of the "normal" range for frequency and timing. This same system and method can be applied to individual devices as well.

In both examples of visual representations, the visual representation allows a human led investigation of a large amount of user and/or device events occurring over a long timeframe to be analyzed by a human investigator quite rapidly. Patterns can be rapidly seen and caught by the human visually reviewing this.

A SaaS UI 400 is designed to summarize SaaS and Cloud overall user activity. A cyber security appliance with a SaaS UI 400 having multiple windows, classifiers, and models can be configured to visually represent overall user activity in the SaaS and/or Cloud environment The SaaS UI 400 visualizes the activity of the user in a window which is subdivided into rolling logs, further information and a graphical representation of activity over time. The SaaS UI 400 is designed to summarize SaaS and Cloud overall user activity will consist of multiple windows.

The SaaS UI 400 displays when date wise model breaches occurred, a plot of breaches across a time line, the number of active users, the number of models in breach, and amount of incidents that rose to a reportable level of anomalous, a graph tree of account interactions between users, actions, services, and resources. Thus, the SaaS UI 400 may show the current number of active users in the network. The user interface may show the number of model breaches. The SaaS UI 400 may show the current number of incidents that the cyber defense system has analyzed and determined that the user needs to further investigation. Each individual model breach may be shown to allow easy investigation. The window may also show locational anomaly visualization with bubble imposed on a map. (For example, see FIG. 3) Many other user activity pieces of information can also be shown on this window of the user interface.

Figure 5:
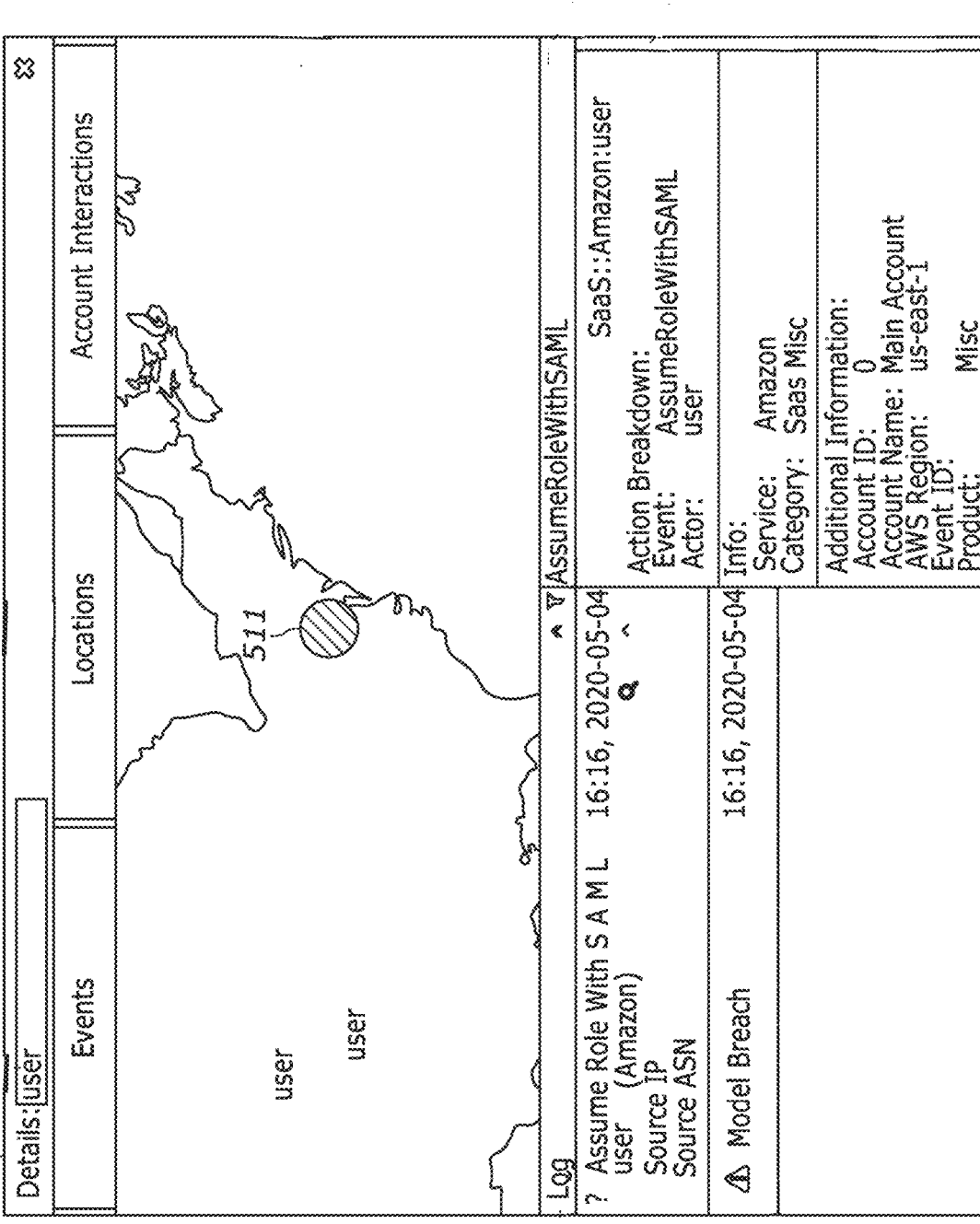
FIG. 5 illustrates a third screenshot of a SaaS UI configured to display a locational anomaly visualization for a particular user and/or event, in accordance with an embodiment of the disclosure.

Another window may also show locational anomaly visualization, for a particular incident and/or a particular user. See FIG. 5, which illustrates a third screenshot of a SaaS UI 500 configured to display a locational anomaly visualization for a particular user and/or event, in accordance with an embodiment of the disclosure. The SaaS console is configured to produce a first SaaS UI 500 having a first window cooperating with a first classifier, where the first SaaS UI 500 is configured to visually display one or more locational anomalies for the entity on a geographical map as well as the first classifier is trained to generate a kind of anomaly detected in the first window corresponding to the visual display/representation of the locational anomalies on first SaaS UI 500.

Figure 6:
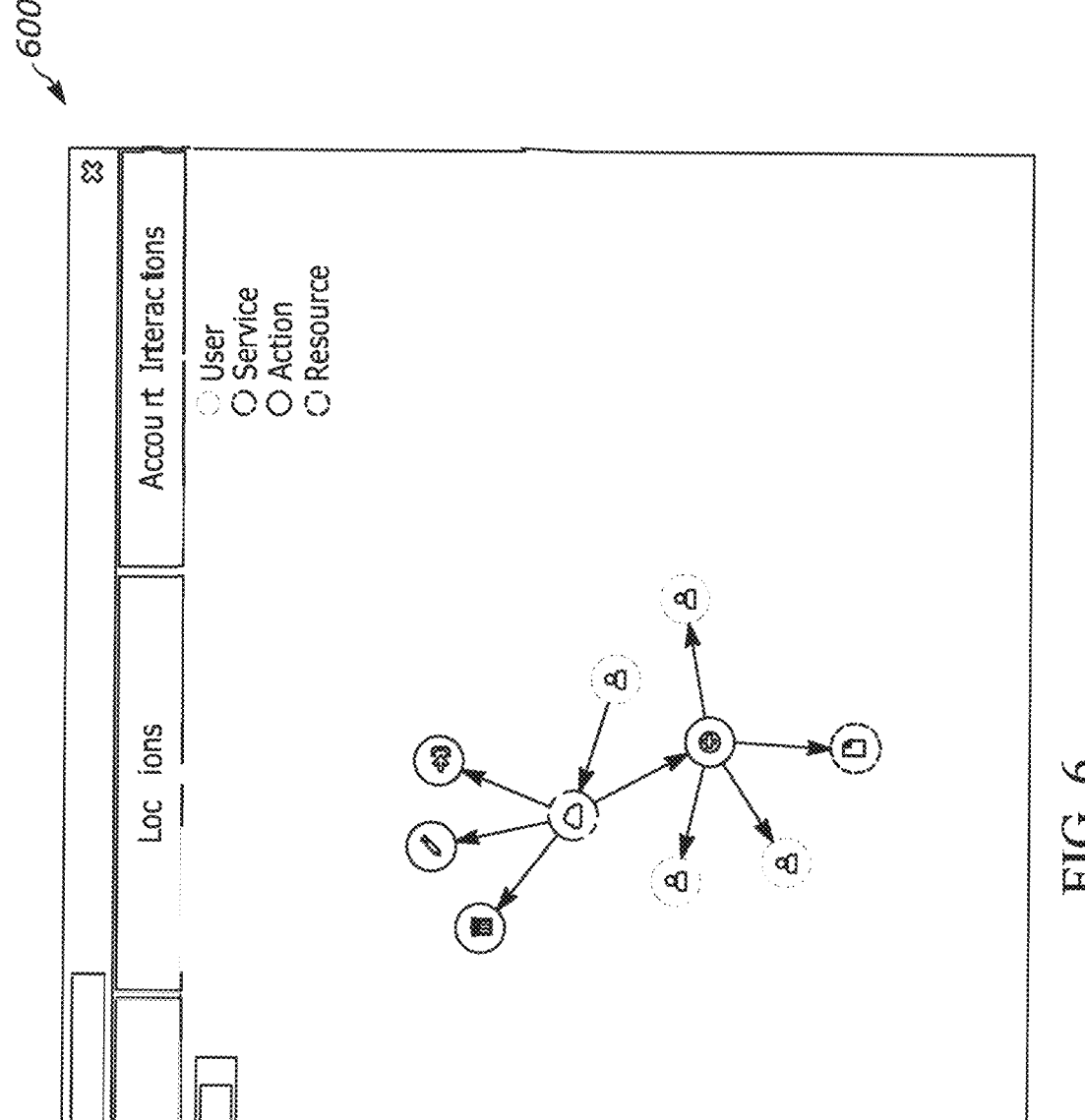
FIG. 6 illustrates a fourth screenshot of a SaaS UI configured to display an investigative window with a simple visualization of all user activity in a predetermined time window, where the user's activities are represented as a series of interconnected nodes with directional arrows, in accordance with an embodiment of the disclosure.

FIG. 6 illustrates a fourth screenshot of a SaaS UI configured to display an investigative window with a simple visualization of all user activity in a predetermined time window, where the user's activities are represented as a series of interconnected nodes with directional arrows, in accordance with an embodiment of the disclosure. A SaaS UI 600 may also display another investigative window with a rolling log that summarizes SaaS and Cloud activity for the user with simplified icons to represent each activity type. Activity is often vendor-specific and hard to understand from an operator perspective so graphical representation (e.g. a user icon, a trash icon, a pencil icon) can lower the bar to entry for an operator/analyst. Furthermore, it allows the chain of events to be understood quickly and with little investigation required. The graphical representation of activity over time renders each user activity as points on a graph where different event types are rendered as different colored dots and can be filtered out of the log and graph by clicking the hide icon.

These SaaS UIs are configured to produce a second SaaS UI used to visually display a user activity anomaly in a SaaS and/or Cloud environment that allows a user-based investigation of a large amount of user events occurring over a long timeframe to be reviewed by the human investigator quite rapidly.

The SaaS UI 600 may also display another investigative window with a simple visualization of all activity for the user in a given time window where the resources they act upon and the actions taken are represented as a series of connected nodes with directional arrows. These nodes can use simple graphical representations (a file icon for a file, a user icon for a user, etc.) to give an at-a-glance awareness to a cyber-analyst. E.g. a large number of file icons under a download icon demonstrate a user potentially about to exfiltrate data. An example chain of behavior is represented as a user (central node) acting upon a SaaS service (cloud icon node connected to user node via arrow), performing a delete (trash can icon connected to the cloud node via an arrow) on a file (a file icon node connected to the trash can). A key assists the operator in identifying resources, actions, services and users.

Figure 7:
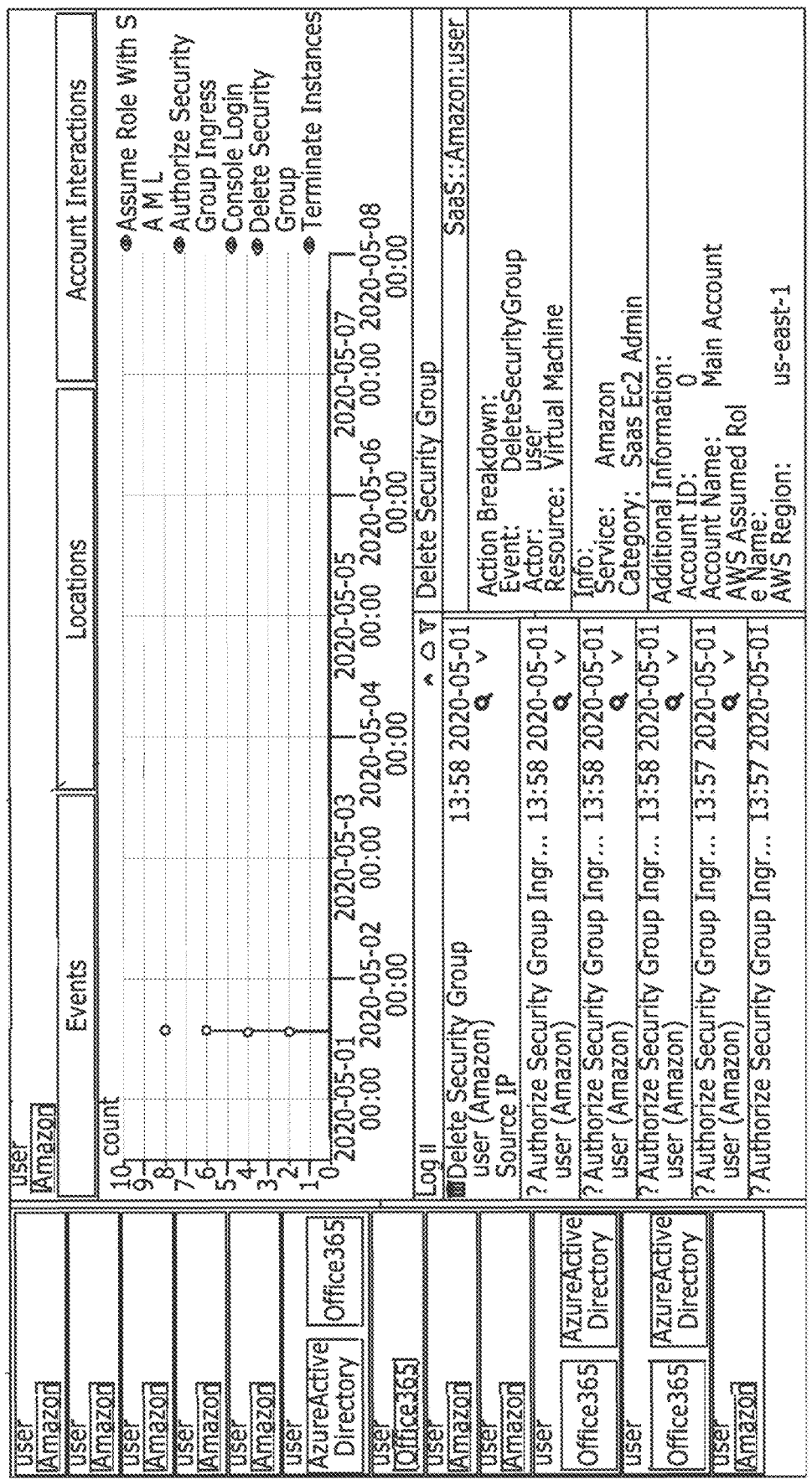
FIG. 7 illustrates a fifth screenshot of a SaaS UI configured to display an investigative window with user activity from various SaaS/cloud-based environments, information specific about each event for a detailed investigation, and outputs provided from classifiers on a rarity of locations and events for that user, in accordance with an embodiment of the disclosure.

FIG. 7 illustrates a fifth screenshot of a SaaS UI configured to display an investigative window with user activity from various SaaS/cloud-based environments, information specific about each event for a detailed investigation, and outputs provided from classifiers on rarity of locations and events for that user, in accordance with an embodiment of the disclosure.

The SaaS UI 700 may also display another investigative window with a user activity displayed from multiple SaaS environments such as Amazon, Azure, Microsoft 365, etc. User activity can be displayed in this log from multiple SaaS environments where the classifiers (and querier) are able to identify accounts on other platforms for the same user—this gives a better overview of actions and chains of behavior that involve more than one service. The SaaS UI 700 may also display information specific about each event for a detailed investigation and provide outputs from classifiers on rarity of locations and events for a user.

A cyber security appliance with a SaaS user context querier and a user interface can be configured to identify and track an entity across different SaaS and/or Cloud environment platforms. The SaaS Pre-emptive Risk Detector and the user interface visually showing overall user activity in a SaaS and/or Cloud environment. The SaaS console is configured to produce a third SaaS UI having multiple windows that cooperates with one or more artificial intelligence trained classifiers, and one or more trained machine learning models to visually display overall user activity. A service coded in a container that regularly requests contextual data about a user (email, phone, full name, access IPs/hostnames, etc.) from a SaaS service in order to match that user to a device or a user in an alternative SaaS or Cloud environment, such as Amazon, Azure, Microsoft 365, etc., also monitored by the Cyber Security system of cyber security appliances. This allows for cross-platform activity patterns to be derived and then to be displayed on a user interface. (See the example user interface in FIG. 7) The service also requests any behavioral models that the third-party platform has already created such as login time/location predictions, roles (and role recommendations) and usage patterns and any historic reports such as quarantine or compliance reports. This is used to profile the user and the risks they may display or be exposed to. The querier uses the contextual data to attempt to match network, email and other SaaS platform users into one centralized profile. Generally, the user will have different usernames on different SaaS and/or Cloud environment platforms. Characteristics of and specific identifying information different usernames on different SaaS and/or Cloud environment platforms are tracked. When enough characteristics of and specific identifying information different usernames overlap, then the different usernames on different SaaS and/or Cloud environment platforms are attempted to be matched. This context querier to identify and track an entity across different SaaS and/or Cloud environment platforms can also be incorporated the multiple window user interface above to give a greater understanding of overall user activity.

The SaaS consoles UIs are configured to visually display any relevant SaaS data retrieved from the SaaS environment compared to one or more UI's for the cloud environment, the network environment, the email environment, and the hybrid environment on a same display screen to contextualize the event based activity data being displayed on a UI displaying the SaaS environment.

As shown in FIG. 1, the AI-based cyber threat detection system 100 may comprise a cyber security appliance 120 including, but is not limited to, a SaaS module, a SaaS UI module, a host endpoint security module, and various other modules that are configured to cooperate with each other and one or more machine learning models. In the illustrated embodiments, the cyber security appliance 120 may be implemented to protect, identify, and track a variety of potential cyber threats, anomalies, event, and/or user activities within the AI-based cyber threat detection system 100. Accordingly, in most embodiments described herein, the cyber security appliance 120 may be configured to utilize a SaaS module, a host endpoint security module, and/or a SaaS UI module—in addition to any other available modules—to thereby display any type of SaaS user activities, events, locations, anomalies, cyber threats, and so on.

FIG. 1 illustrates a block diagram of an embodiment of a cyber threat defense system with a cyber threat module that references machine learning models that are trained on the normal behavior of network activity and user activity associated with a network. The cyber threat module determines a threat risk parameter that factors in 'what is a likelihood of a chain of one or more unusual behaviors of SaaS activity, network activity, and user activity under analysis that fall outside of being a normal benign behavior;' and thus, are likely malicious behavior.

The cyber threat defense system 100 may protect against cyber security threats from a SaaS system as well as its network. The cyber threat defense system 100 may include components such as i) a trigger module, ii) a gather module, iii) a data store, iv) a probe module, v) a Software-As-A-Service (SaaS) module, vi) a coordinator module, vii) a comparison module, viii) a cyber threat module, ix) a user interface module, x) a researcher module, xi) an autonomous response module, xii) at least one input or output (I/O) port to securely connect to other ports as required, xiii) one or more machine learning models such as a first Artificial Intelligence model trained on characteristics of vectors for malicious activity and related data, multiple Artificial Intelligence models trained on SaaS events and other SaaS activity for each specific SaaS application, a third Artificial Intelligence model trained on potential cyber threats, and one or more Artificial Intelligence models each trained on different users, devices, system activities and interactions between entities in the system, and other aspects of the system, as well as xiv) other similar components in the cyber threat defense system.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the SaaS module monitoring SaaS activity, the comparison module to apply one or more models trained on different aspects of this process, and the cyber threat module to identify cyber threats based on comparisons by the comparison module. Each hypothesis of typical threats can have various supporting points of data and other metrics associated with that possible threat, such as a human user insider attack, inappropriate network behavior, or SaaS behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the probe module, the SaaS module, and the coordinator module may be portions of the cyber threat module.

A probe module can be configured to collect probe data from a probe deployed to a network entity. The network entity represents at least one of a user and a network device interacting with the network. The probe data describes any activity executed by the network entity and administrated by a network administrator associated with the network. Such network-administrated activity would be external to any activity by the SaaS application executed by the network entity, which is hosted by a third-party operator platform. A network-administrated activity may be network activity or SaaS activity. Note, the probe module may be divided into an email module and a network module.

A SaaS module can be configured to collect third-party event data describing an administrative event of a SaaS application operating on a network entity for use in identifying a cyber threat, in conjunction with the probe module. Examples of a SaaS application may include Salesforce®, Microsoft Office 365®, Box®, Dropbox®, or Google G-Suite®. A third-part operator may administrate the SaaS application. The cyber threat defense system can have a connector remotely installed on each network entity that utilizes the SaaS application. The at least one connector accesses the administrative event via the third-party operator platform. The SaaS module can connect to the connector via at least one input port.

The SaaS module may use a variety of approaches to retrieve data from a third-party operator platform including connectors and the customized generic templates. The connectors can be configured based on the specifications of the third-party operator platform. The connectors can be configured to access the administrative events using an application programming interface (API) interaction, accessing a SaaS application tool, or by making a Hypertext Transfer Protocol Secure (HTTPS) request. The SaaS application tool can be a user tool, an audit tool, or an event logging tool. For security purposes, the cyber threat defense system may prefer that the connectors control the data transfer. However, in some instances, the third-party operator platform may initiate the data transmission.

As discussed the customized generic template can have a user of a SaaS platform fill in the data desired to be pulled/retrieved. In addition, the SaaS module can communicate with a connector to pull data from the third-party operator platform on an event-by-event basis. The SaaS module can be configured to direct at least one connector to request an administration event. The connector can request any administrative events on a cyclical basis, such as every 60 seconds. For security purposes, the connector can encode an event request according to a Hypertext Transfer Protocol Secure protocol before sending it to the third-party operator platform administrating and hosting the SaaS application. The connector can then request third-party event data describing an administrative event. The third-party operator platform may provide the third-party event data to the connector. The connector forwards the third-party event data to an input port of the cyber threat defense system. The SaaS module then receives and processes the third-party event data. The SaaS module is configured to harvest metadata detailing any administrative events from the event report. The SaaS module is configured to anonymize the metadata to remove any personally identifiable information for the third-party operator platform from the metadata.

The cyber threat module may also use one or more machine-learning models trained on cyber threats in the network. The cyber threat module may reference the models that are trained on the normal behavior of user activity, network activity, and SaaS activity associated with the network. The cyber threat module can reference these various trained machine-learning models and data from the probe module, the SaaS module, and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The cyber threat defense system 100 may also include one or more machine learning models trained on gaining an understanding of a plurality of characteristics on a SaaS administrative event and related data including classifying the properties of the SaaS administrative event and its meta data.

The cyber threat module can also reference the machine learning models trained on a SaaS administrative event and related data to determine if a SaaS administrative event or a series of SaaS administrative events under analysis have potentially malicious characteristics. The cyber threat module can also factor this SaaS administrative event characteristics analysis into its determination of the threat risk parameter.

The one or more machine learning models can be self-learning models using unsupervised learning and trained on a normal behavior of different aspects of the system, for example, device activity and user activity associated with a SaaS application. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The autonomous response module can interact with the SaaS module and the cyber threat module to automatically respond to any issues with a SaaS application. The cyber threat module may analyze the third-party event data from a third-party operator platform administrating and hosting the SaaS application to identify any cyber threats.

Any instructions of any modules depicted in the cyber security appliance 120 of FIG. 1 may be scripted to be stored in an executable format in one or more memories and implemented by one or more processors of the respective endpoint computing devices.

FIG. 2 illustrates an exemplary block diagram of an AI-based cyber security system having a cyber security appliance 120 configured to protect various network devices, endpoint computing devices, and a SaaS/cloud-based platform communicatively coupled over a network, in accordance with an embodiment of the disclosure.

FIG. 9 illustrates an example cyber threat defense system 120 protecting an example network. The system comprises a first computer system 910 within a building, which uses the threat detection system to detect and thereby attempt to prevent threats to computing devices within its bounds. The first computer system 910 comprises three computers 901, 902, 903, a local server 904, and a multifunctional device 905. All of the devices within the first computer system 910 are communicatively coupled via a Local Area Network 906. Consequently, all of the computers 901, 902, 903 are able to access the local server 904 via the LAN 906 and use the functionalities of the MFD 905 via the LAN 906.

The LAN 906 of the first computer system 910 is connected to the Internet 920, which in turn provides computers 901, 902, 903 with access to a multitude of other computing devices including server 930 and second computer system 940. Second computer system 940 also includes two computers 941, 942, connected by a second LAN 943.

The threat detection system 120 runs the threat detection method for detecting threats to this computer system. As such, it comprises a processor arranged to run the steps of the process described herein, memory required to store information related to the running of the process, as well as a network interface for collecting the required information. This method shall now be described in detail with reference to FIG. 9.

The security appliance 120 builds and maintains a dynamic, ever-changing model of the 'normal behavior' of each user and machine within the system 910. The approach is based on Bayesian mathematics, and monitors all interactions, events and communications within the system 910—which computer is talking to which, files that have been created, networks that are being accessed.

For example, computer 902 is based in a company's San Francisco office and operated by a marketing employee who regularly accesses the marketing network, usually communicates with machines in the company's U.K. office in second computer system 940 between 9.30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively simple policing process. These sophisticated attackers look for activity that is not directly associated with the users input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access;

Data access;

Timings of events;

Credential use;

DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:

Raw network IP traffic captured from an IP or other network TAP or SPAN port;

Machine generated log files;

Building access ("swipe card") systems;

IP or non IP data flowing over an Industrial Control System (ICS) distributed network;

Individual machine, peripheral or component power usage;

Telecommunication signal strength; and/or

Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:

The number of bytes of data entering or leaving a networked device per time interval.

File access.

The commonality/rarity of a communications process

Invalid SSL certification.

Failed authorization attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc.

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud-based systems, or from communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and/or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Network

A number of electronic systems and devices can communicate with each other in a network environment. The network environment has a communications network in which client devices can access SaaS applications and services hosted on a cloud platform. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud users cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system.

It should be noted that the present design can be carried out on a single computing system and/or on a distributed system in which different portions of the present design are carried out on different parts of the distributed computing system.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. A module may be implemented with electronic hardware, software, and/or a combination of software and electronic hardware cooperating, to perform the functions discussed herein for that module.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
a processor; and
a non-transitory computer readable medium including
a Software as a Service (SaaS) console that, when executed by the processor, configured to retrieves data from one or more application programming interfaces (APIs) hosted by one or more SaaS platforms in order to identify a cyber threat in a cyber threat defense system, the SaaS console is further configured to conduct a regular i) polling service, ii) data retrieval service, and iii) any combination of both and obtain data from the one or more APIs hosted by one or more SaaS platforms to collect event-based activity data from the one or more APIs, wherein the SaaS console is further configured to generate a plurality of SaaS user interfaces (UIs) for visually displaying the collected event-based activity data including at least a SaaS UI used to display a visual representation of the SaaS user activities illustrated as one or more paths interconnecting a series of nodes, where each node represents a file, folder or other storage resource and each of the one or more paths is assigned (i) a color representing normal or anomalous user activity and (ii) a line thickness representing a frequency of use,
a cyber threat module that, when executed by the processor, configured to detects the cyber threat based on at least a determination whether the event-based activity data identifies behaviors that are different from normal behavior associated with the activity as determined by machine learning models accessible by the cyber threat module, and
an autonomous response module communicatively coupled to the cyber threat module, the autonomous response module that, when executed by the processor, is configured to generate an autonomous action itself; rather than a human, in response to the cyber threats, where the autonomous response module is configured to cause one or more autonomous actions to be taken to contain the cyber threat when a threat risk parameter determined by and provided from the cyber threat module is equal to or above an actionable threshold, where the cyber threat module is configured to cooperate with the autonomous response module, to cause the one or more autonomous actions to be taken to contain the cyber threat by limiting an impact of the cyber threat from consuming unauthorized CPU cycles, memory space, and power consumption in a computing device via responding to the cyber threat without waiting for some human intervention.

2. The apparatus of claim 1, wherein the SaaS console is configured to cooperate with one or more machine-learning models trained on a normal benign behavior of an entity to compare at least one or more of the collected event-based activity data from the incorporated data to one or more machine-learning models trained on a normal benign behavior of that entity in relation to the SaaS environment using a normal behavior benchmark.

3. The apparatus of claim 1, wherein the generate a plurality of SaaS UIs are generated for visually displaying the collected event-based activity data to a second user operating the first SaaS console.

4. The apparatus of claim 3, wherein the SaaS console with the plurality of SaaS UIs is further configured to visually display the event-based activity data with multiple user interfaces, where each user interface is configured to display a particular type of SaaS event-based activity data, where the event-based activity data can include one or more of event anomaly data, location anomaly data, and action anomaly data in a SaaS environment.

5. The apparatus of claim 4, wherein the SaaS console is further configured to produce a first SaaS UI having a first window cooperating with a first classifier, where the first SaaS UI is configured to visually display one or more locational anomalies for the entity on a geographical map as well as the first classifier is trained to generate a kind of anomaly detected in the first window corresponding to the visual representation of the locational anomalies on the first SaaS UI.

6. The apparatus of claim 4, wherein the SaaS console is further configured to produce the SaaS UI used to visually display the user activity anomaly in a SaaS and/or Cloud environment with the visual representation of a tree-like structure that allows a user-based investigation of a large amount of user events occurring over a long timeframe to be reviewed by a human investigator, and a third SaaS UI having multiple windows that are configured to cooperate with one or more artificial intelligence trained classifiers, and one or more trained machine learning models to visually display overall user activity.

7. The apparatus of claim 3, wherein the SaaS console with the plurality of SaaS UIs is configured to use non-numeric shapes, symbols, and/or colors associated with the series of nodes to visually display different types of SaaS event-based activity data so that abnormal event-based activity data is quickly recognizable.

8. The apparatus of claim 1, wherein customizable generic templates are used to provide at least the data retrieval services and are configured to be capable of being shared and used by all of the users operating the SaaS console to provide the regular i) polling service, ii) data retrieval service, and iii) any combination of both, to obtain the data from the one or more APIs.

9. The apparatus of claim 1, wherein the cyber threat module in cooperation with one or more machine learning models trained on a normal benign behavior of that entity in relation to the SaaS environment is configured to determine whether the entity is in a breach state of a normal behavior benchmark.

10. The apparatus of claim 1, wherein the cyber threat module in cooperation with one or more machine learning models trained on cyber threats is configured to identify whether a determined breach state of a normal behavior benchmark in conjunction with a chain of relevant behavioral parameters are deviating from a normal benign behavior of that entity correspond to a cyber threat.

11. A method for a Software as a Service (SaaS) console, comprising:

retrieving, by configuring the SaaS console, to retrieve data from one or more application programming interfaces (APIs) hosted by one or more SaaS platforms in order to identify cyber threats in a cyber threat defense system;

utilizing, by configuring the SaaS console, to use customizable generic templates to conduct a regular i) polling service, ii) data retrieval service, and iii) any combination of both and obtain data from the one or more APIs hosted by one or more SaaS platforms to collect event-based activity data;

generating a plurality of SaaS user interfaces (UIs) for visually displaying the collected event-based activity data including at least a SaaS UI used to display a visual representation of the SaaS user activities illustrated as one or more paths interconnecting a series of nodes, where each node of the series of nodes represents a file, folder or other storage resource and each of the one or more paths is assigned (i) a color representing normal or anomalous user activity and (ii) a line thickness representing a frequency of use;

configuring a cyber threat module to detecting, by a cyber threat module, the cyber threat based at least a determination whether the event-based activity data identifies behaviors that are different from normal behavior associated with the activity as determined by machine learning models accessible by the cyber threat module;

generating configuring an autonomous response module to generate an autonomous action by an autonomous response module, itself; rather than a human, in response to the cyber threats;

causing, by configuring the autonomous response module, to cause one or more autonomous actions to be taken to contain the cyber threat when a threat risk parameter determined by and provided from the cyber threat module is equal to or above an actionable threshold; and based on configuring where the cyber threat module cooperating to cooperate with the autonomous response module, causing to cause the one or more autonomous actions to be taken to contain the cyber threat by limiting an impact of the cyber threat from consuming unauthorized CPU cycles, memory space, and power consumption in a computing device via responding to the cyber threat without waiting for some human intervention.

12. The method of claim 11, further comprising:

comparing, by configuring the SaaS console cooperating to cooperate with one or more machine-learning models trained on a normal benign behavior of an entity, to compare at least one or more of the collected event-based activity data from the incorporated data to one or more machine-learning models trained on a normal benign behavior of that entity in relation to the SaaS environment using a normal behavior benchmark.

13. The method of claim 11, wherein the plurality of SaaS UIs are generated for visually displaying the collected event-based activity data to a second user operating the SaaS console.

14. The method of claim 13, further comprising:

visually displaying, by configuring the SaaS console with the plurality of SaaS UIs, to visually display the event-based activity data with multiple user interfaces, where each user interface is configured to display a particular type of SaaS event-based activity data, where the event-based activity data can include one or more of event anomaly data, location anomaly data, and action anomaly data in a SaaS environment.

15. The method of claim 13, further comprising:

producing, by configuring the SaaS console, to produce a first SaaS UI having a first window cooperating with a first classifier, where the first SaaS UI is configured to visually display one or more locational anomalies for the entity on a geographical map as well as the first classifier is trained to generate a kind of anomaly detected in the first window corresponding to the visual representation of the locational anomalies on the first SaaS UI.

16. The method of claim 13, further comprising:

producing, by configuring the SaaS console, to produce a second SaaS UI used to visually display a user activity anomaly in a SaaS and/or Cloud environment with a visual representation of a tree-like structure that allows a user-based investigation of a large amount of user events occurring over a long timeframe to be reviewed by a human investigator, and a third SaaS UI having multiple windows that are configured to cooperate with one or more artificial intelligence trained classifiers, and one or more trained machine learning models to visually display overall user activity.

17. The method of claim 13, further comprising: wherein configuring the SaaS console with the plurality of SaaS UIs are is configured to use non-numeric shapes, symbols, and/or colors to visually display different types of SaaS event-based activity data so that abnormal event-based activity data is quickly recognizable by a human that some SaaS activity indicated on a display screen with the non-numeric shapes, symbols, and/or colors is different from a normal event-based activity data.

18. The method of claim 11, wherein further comprising: configuring the customizable generic templates are configured to be capable of being shared and used by all of the users operating the SaaS console to provide the regular i) polling service, ii) data retrieval service, and iii) any combination of both, to obtain the data from the one or more APIs.

19. The method of claim 11, further comprising:

identifying, by configuring the cyber threat module in cooperation with one or more machine learning models trained on cyber threats, to identify whether a determined breach state of a normal behavior benchmark in conjunction with a chain of relevant behavioral parameters are deviating from a normal benign behavior of that entity correspond to a cyber threat.

20. A non-transitory computer readable medium in a SaaS console, comprising: one or more computer readable codes operable, when executed by one or more processors in a computing device, to instruct the SaaS console to perform the method of claim 11.

\* \* \* \* \*